May 19, 1936.  E. R. ALLING  2,041,451
UNLOADER FOR WASHED CANS AND COVERS
Filed March 15, 1934  6 Sheets-Sheet 1
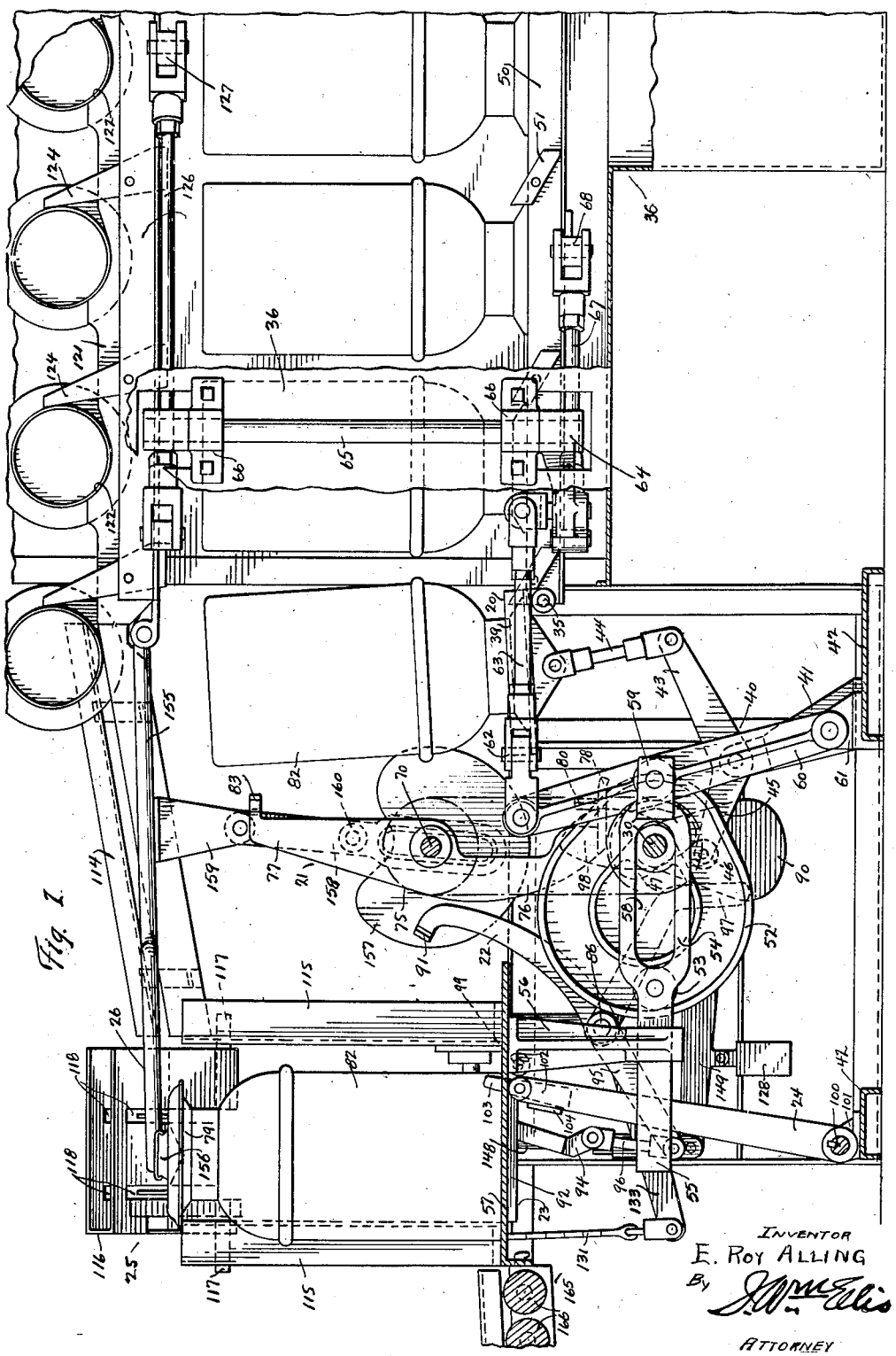
INVENTOR
E. Roy ALLING
By 
ATTORNEY

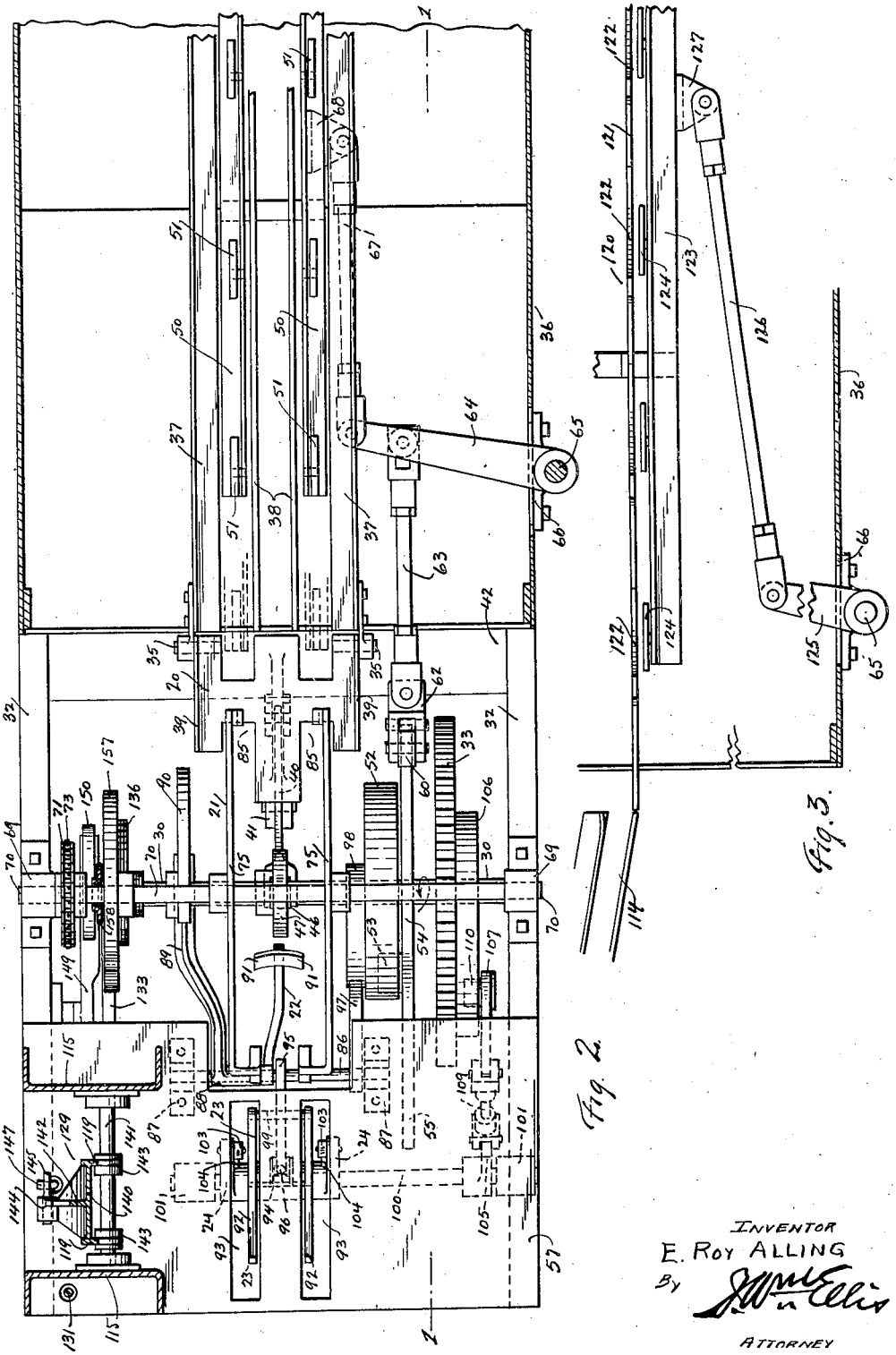

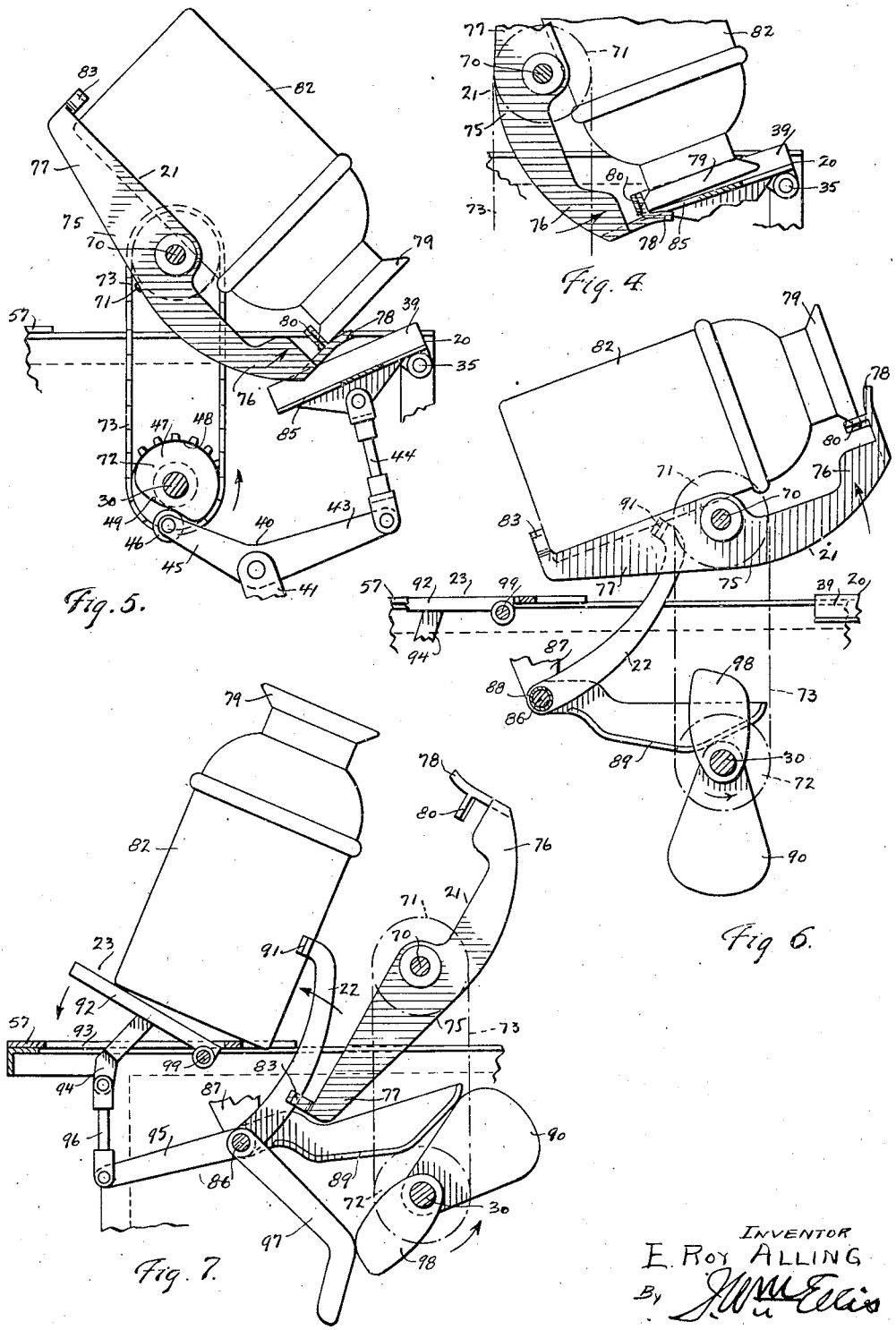

May 19, 1936.  E. R. ALLING  2,041,451
UNLOADER FOR WASHED CANS AND COVERS
Filed March 15, 1934  6 Sheets-Sheet 4

INVENTOR
E. Roy ALLING
ATTORNEY

May 19, 1936.  E. R. ALLING  2,041,451
UNLOADER FOR WASHED CANS AND COVERS
Filed March 15, 1934  6 Sheets-Sheet 5

INVENTOR
E. Roy ALLING
BY
ATTORNEY

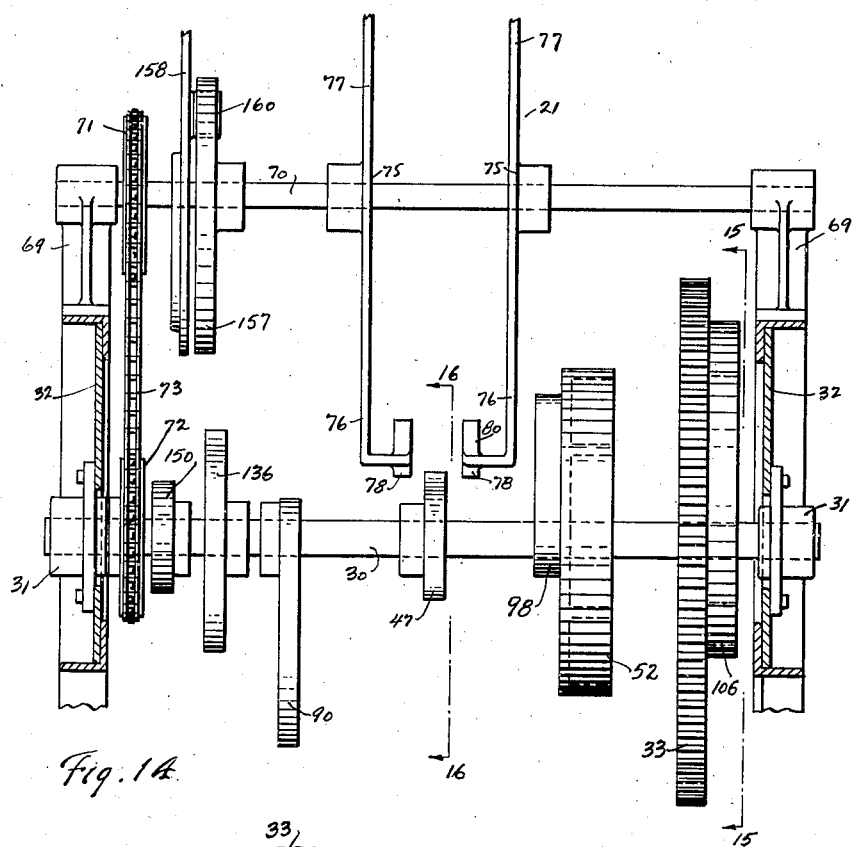
Fig. 14.
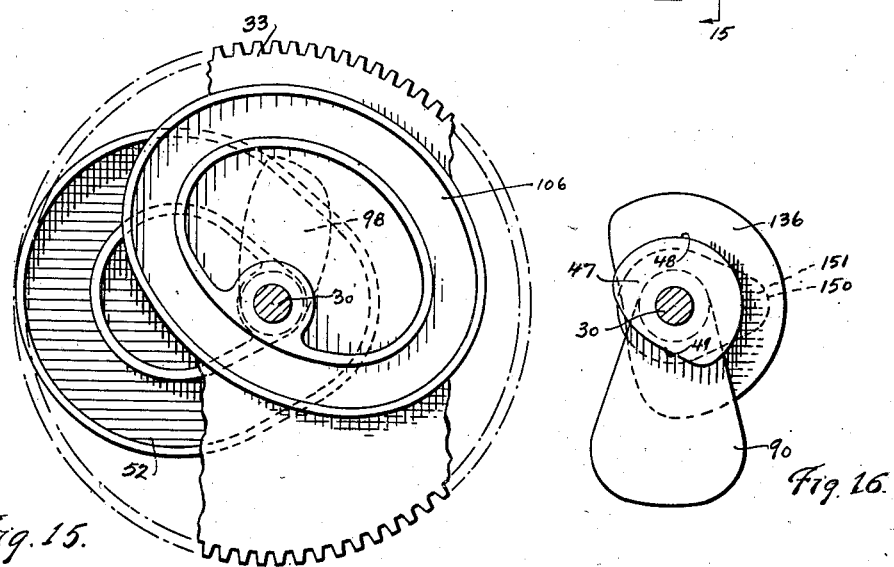
Fig. 15.
Fig. 16.
INVENTOR
E. Roy ALLING
ATTORNEY Patented May 19, 1936

2,041,451

UNITED STATES PATENT OFFICE 2,041,451

UNLOADER FOR WASHED CANS AND COVERS

E. Roy Alling, Kenmore, N. Y.

Application March 15, 1934, Serial No. 715,669

27 Claims. (Cl. 29—84)

My device relates in general to unloading devices and in particular to means for inverting milk cans or other utensils from a mouth-down position as they come from the washing machine to a mouth-up position.

It is well known to those skilled in the art, that in unloading devices of the present day, the motion of the cans is intermittent and jerky, and results in considerable noise and slight but persistent damage to the cans and covers thereof. This is particularly true where cans are inverted by gravity by being allowed to tilt or fall sidewise and strike against an obstacle in such a manner that their movement and the force of gravity carry them to an inverted position or when the cans are allowed to fall into a reversing means.

It has been an object of my invention to overcome all the above mentioned disadvantages, and to provide a device whereby the cans will be inverted with a smooth, harmonious motion and in which the covers will be quietly placed upon the cans and then seated within the mouth of the can by means of momentary, shockless pressure.

Another object has been to provide a cradle and associated means whereby the can may be quietly taken from the tracks of the washing machine and turned right side up in a smooth, steady and even manner with an almost entire absence of noise, vibration and shock.

Another object has been to provide such a device by which cans of various heights and diameters may be handled without any manual adjustment.

Moreover, my device is of such a nature that any drops of water hanging between the reversing means and the can mouth shall be allowed to drip away from the lip of the can before the can has reached its upright position.

Furthermore, by means of my device, covers may be assembled upon the cans and pressed into the mouths thereof.

The above objects and advantages have been accomplished by the device shown in the accompanying drawings, of which:

Fig. 1 is a fragmentary, sectional, side elevation of my device.

Fig. 2 is a fragmentary, sectional, plan view thereof.

Fig. 3 is a fragmentary, plan view of a portion of the cover feeding mechanism.

Figs. 4 to 7, inclusive, show a milk can in various positions and fragmentary portions of the mechanism for inverting it from a mouth-down to a mouth-up position.

Figure 8:
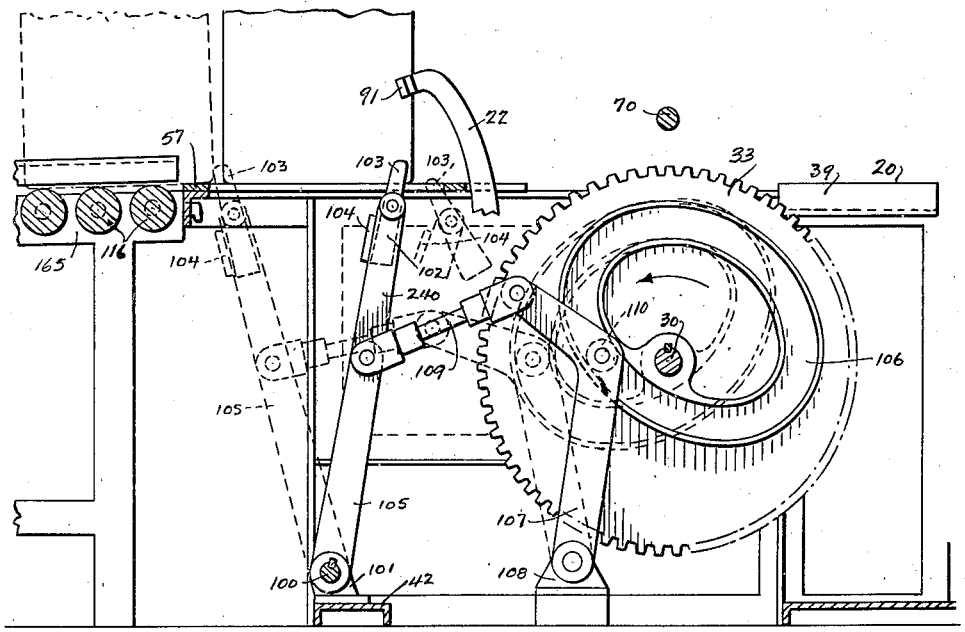

Fig. 8 is a fragmentary view of the mechanism for discharging the uprighted can from the device.

Figure 9:
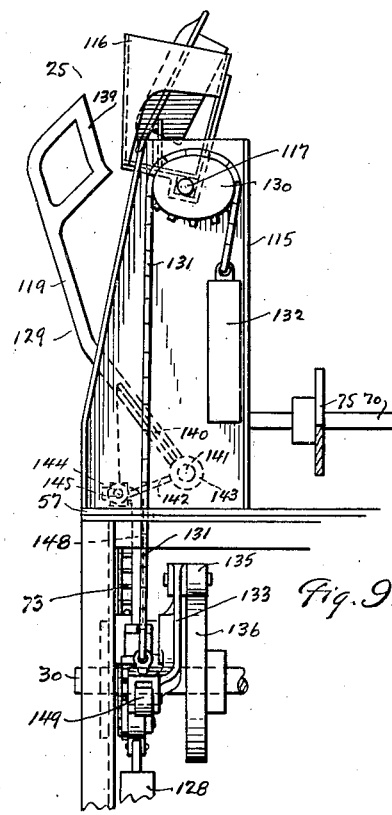
Figure 10:
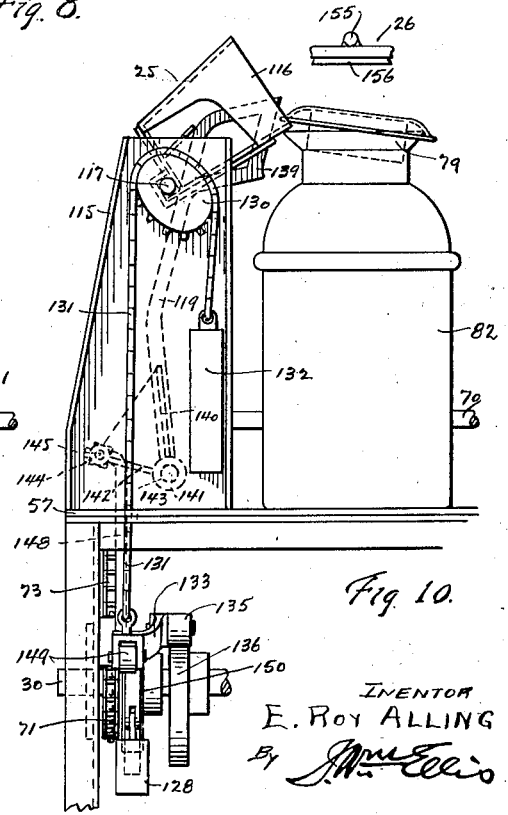

Figs. 9 and 10 are front elevations of the cover feeding mechanism, shown in two of its positions.

Figure 11:
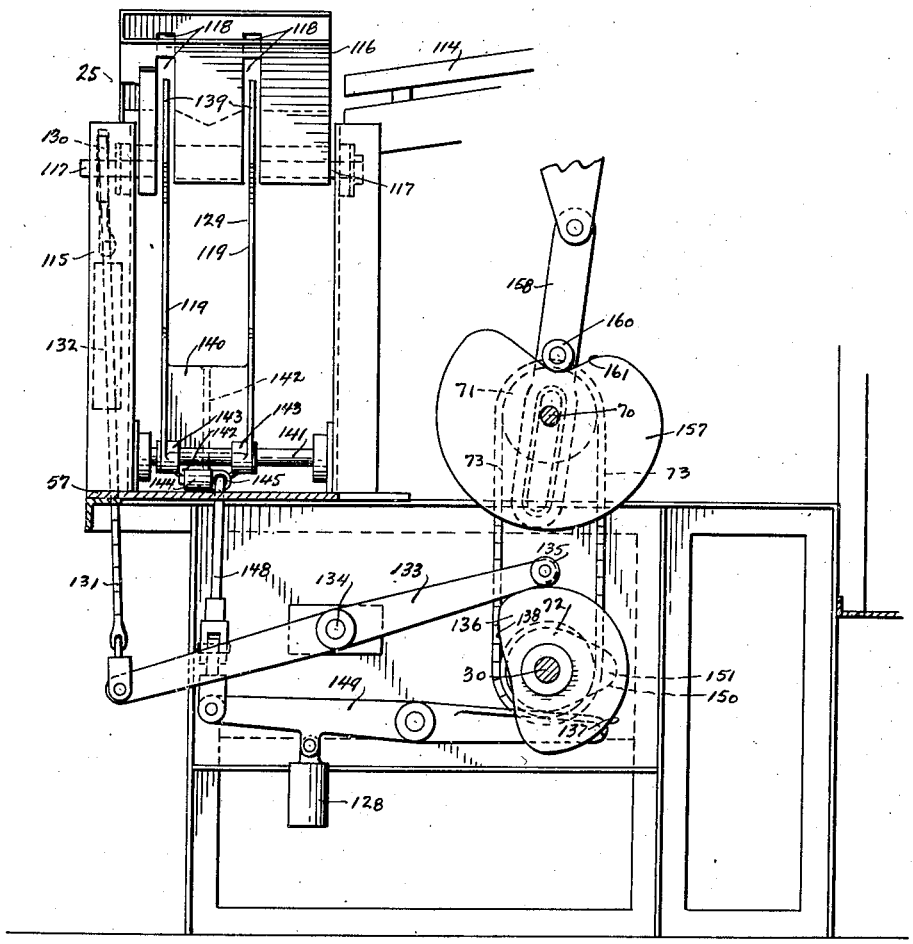

Fig. 11 is a fragmentary, sectional, side elevation of the cover feeding mechanism.

Figure 12:
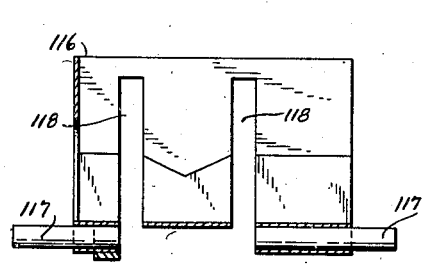

Fig. 12 is an enlarged, detailed view of the cover hopper.

Figure 13:
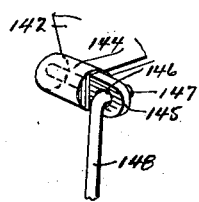

Fig. 13 is an enlarged, fragmentary, detailed view of a portion of the cover ejector.

Fig. 14 is an enlarged, fragmentary, plan view of the cams for actuating my device.

Fig. 15 is an enlarged, fragmentary, side elevation showing some of the cams, and is taken on line 15—15 of Fig. 14.

Fig. 16 is a similar view of other of the cams, and is taken on line 16—16 of Fig. 14.

My device is applicable to the handling of any receptacle which is washed in a mouth-down position and which must be inverted to its mouth-up position after leaving the washing machine, and in the drawings I have shown a device especially adapted for the handling of milk cans and the covers thereof.

My device is arranged at the discharge end of the can washing machine with which it is to be used, and it is so connected with the can and cover feeding mechanism of such washing machine that the movements of the device are timed with the movements of the can washer.

My device comprises in general a tilting table 20 arranged at the discharge end of the can washer; a constantly revolving cradle 21; a pusher 22; a can lowering shelf 23; discharge levers 24; cover handling mechanism 25; and a cover presser 26.

These various parts of my device are operated in timed relation with each other by means of suitable cams to be hereinafter specifically described. These cams are mounted upon a cam shaft 30 which is mounted in suitable bearings 31 carried by the frame 32 of the device. The cam shaft 30 is preferably driven by a spur gear 33 which is rigidly mounted upon the shaft 30 and connected by a suitable pinion (not shown) to any suitable source of power (not shown).

The tilting table 20 is pivotally mounted on trunnions 35 and is arranged at the discharge end of the can washer 36 and in registration with the side rails 37 and tracks 38 thereof. The tilting table is provided with side flanges 39 which keep the can centrally thereupon. The tilting table is intermittently operated each time a can is pushed thereon. A table arm 40 is pivotally carried at an intermediate portion by a bracket 41 secured to the base 42 of the machine. The end 43 of this arm is pivotally connected to the table 20 by means of a link 4. The opposite end 45 of the arm carries a roller 46 which engages a table cam 47. This cam is carried by the main cam shaft 30 and is provided with an annular portion 48 which keeps the table normally in its elevated position, or in a position where its top surface lies in a plane substantially parallel with the tracks 38 of the washer. The cam is also provided with a flattened surface 49 which permits this table to be gradually lowered and raised and held momentarily in its tilted position, as shown in Fig. 5.

The cans are intermittently fed through the washing machine by means of dog bars 50 having dogs 51 which serve to push the cans forwardly as the dog bars are reciprocated in a feeding direction and which are depressed by engagement with the can lip and, therefore, moved out of the way as the dog bars are returning to the starting positions. These dog bars and dogs do not form any part of my invention since they are a part of the washing machine. It is, however, necessary that these bars be operated in timed relation with the other mechanisms of my device, and, therefore, they are reciprocated by a suitable cam 52 mounted upon the cam shaft 30. This cam is preferably of the internal grooved type and it is engaged by a roller 53 carried by a reciprocating slotted arm 54. The rear end 55 of this arm is slidably carried in a bracket 56 secured to the platform 57 of the machine and the slot 58 thereof straddles the cam shaft 30, being, however, wider than the diameter of the cam shaft so that some up and down movement of the end 59 of the lever may occur. The end 59 is pivotally secured to a rocker arm 60, the lower end of which is pivotally secured to a bracket 61 carried by the base 42 of the machine. The upper end of the rocker arm 60 has attached thereto a universal joint 62 which is carried at the rear end of a connecting link 63. The opposite end of the link 63 is attached to an operating arm 64. This arm is secured to a vertically arranged feed bar shaft 65, which is pivotally carried preferably on the outside of the machine in bearing brackets 66. A connecting link 67 connects the extreme inner end of the arm 64 with a bracket 68 carried by one of the dog bars. The dog bars are connected together by suitable means so that they will operate in unison. The dog bar cam 52 is so timed in relation to the tilting table cam that the table will begin to tilt after a can has been fed thereon by the operation of the dog bar cam 52.

The cradle 21 of my device is mounted upon a cradle shaft 70. This shaft is mounted in suitable bearings 69 and it is preferably arranged above and in the same vertical plane as the cam shaft 30. It is connected to the cam shaft by means of sprocket wheels 71 and 72 and a sprocket chain 73. The sprocket wheels each have preferably the same number of teeth and, therefore, the shafts are rotated at the same rate of speed. The cradle comprises two side arms 75 which are formed with upper can engaging portions 76 and lower can engaging portions 77. At the outer end of each upper can engaging portion is provided a finger 78 which engages the lip 79 of the can and lifts it from the tilting table 20. A detent 80 is carried by each of the fingers 78 which holds the can in fixed position upon the fingers while the cradle is being rotated to and slightly beyond its horizontal position. The upper can engaging portions 76 of the cradle are cut away, as clearly shown, so as to give sufficient clearance between the can and cradle and provide for the handles (not shown) of the can. The lower can engaging portions 77 of the cradle arms are straight and so arranged that they engage the body 82 of the can and since these arms are separated, they hold the can in its position during the major portion of its movement. At the outer ends of each of these portions of the arms are arranged a suitable stop 83. The distance between the fingers 78 and the stops 83 is slightly greater than the height of the maximum sized can to be handled in the device, and the fingers 78 support the can and prevent its axial movement from the time it is lifted from the tilting table 20 until the can reaches a point slightly beyond the horizontal position. As the cradle continues to rotate, the can will be slid endwise when the frictional engagement of its side walls with the cradle has been overcome and it will then move endwise until the bottom rim thereof engages with the stops 83. These stops will prevent further axial movement until the can has been removed from the cradle. The tilting table is provided in its forward edge with slots 85 and the table is so positioned with relation to the ends of the cradle that such ends will pass through such slots when the cradle is rotating. The tilting table is so timed in relation to the upper can engaging portions 76 of the cradle arms 75 that the fingers 78 carried by these arms will be disposed in the slots 85 of the tilting table and substantially on a line with the surface of such table when the table has reached its maximum lower position, whereby the can is lifted from the table by an even movement without jerk or undue noise.

The pusher 22 of my device is arranged to oscillate between the arms 75 of the cradle and it is carried by a sleeve 88 which is pivotally mounted upon a shaft 86. This shaft is suitably carried by bearings 87 secured to the under side of the platform 57 of the device. The pusher is secured to one end of the sleeve 88 and a pusher cam arm 89 is secured to the other end thereof. The outer end of this arm engages with the pusher cam 90. This cam is carried by the cam shaft 30 and is so designed that it gives considerable movement to the upper end of the pusher 22 which serves to push the can out of the cradle and onto the can lowering shelf 23. The upper end of the pusher is provided with side arms 91 which are curved in shape so as to guide in onto the lowering shelf 23 and prevent lateral movement. The pusher cam 90 is so timed in relation to the rotation of the cradle that when the stops 83 of the cradle are approaching the level of the platform 57 (see Fig. 6), the pusher will start to tip the can forwardly toward an upright position and as the stops 83 reach substantially a position where they are level with the platform 57, the pusher will have forced the can forwardly away from the cradle and onto the platform and the can lowering shelf 23 (see Fig. 7). This shelf is in the form of a fork having two arms 92 which pass upwardly through slots 93 formed in the platform. These arms are suitably connected together at their forward ends by means of a shaft 99 which is pivotally carried by the platform. The shelf has a downwardly extending arm 94 which is connected to a lever 95 by means of a link 96. The lever 95 is rigidly carried by the shaft 86 and a shelf cam arm 97 is also rigidly secured to the shaft 86 and has its outer end engaging with a tilting shelf cam 98. This shelf cam 98 is so designed and timed in relation to the pusher cam 90 and the cradle that the shelf will be elevated to the position shown in Fig. 7 as the pusher moves the can out of the cradle and onto the shelf. As the cradle continues to rotate, the pusher continues to move the can rearwardly along the shelf 23 and platform 57 until the position shown in Fig. 1 is reached, after which the pusher will be withdrawn to its inner position, as shown in Fig. 6. During this period of operation the can lowering shelf will be gradually lowered until it is on a line with the platform 57 and the can will come to rest upon this platform where it will be ready to be discharged therefrom.

The cans after having been lowered onto the platform are discharged therefrom by means of two discharge levers 24. These levers are rigidly secured to a discharge lever shaft 100. This shaft is mounted in suitable bearing brackets 101 carried by the base 42 of the machine. These arms extend upwardly toward the platform 57 and the upper ends 102 thereof are immediately below the platform. A discharge dog 103 is pivotally carried by the upper end 102 of each of these levers, and these dogs project upwardly through the slots 93 formed in the platform. A stop 104 is located on the rear side of each of the levers so that the dogs will be prevented from rotating in a clockwise direction about their pivots but will be permitted to rotate in a counterclockwise direction. As shown in Fig. 8, the levers are in position to force the can from the full line position to the dotted line position and during this movement the dogs which engage the can will be prevented from rotating. However, when the can has reached the dotted line position and the levers are returned to the fragmentary dotted line position of this figure, the dogs will be rotated and will be dragged across the bottom of the next succeeding can which has been lowered onto the platform by the can lowering shelf. The maximum forward movement of the arms as shown by the fragmentary dotted line position is such that the dogs will be behind the next succeeding can and when the arms are again moved rearwardly to feed another can, the dogs will be permitted, by the weight of their lower ends, to again assume their operating positions, as shown by the full line position. The discharge levers are oscillated back and forth by a discharge lever cam 106 which is rigidly mounted upon the cam shaft 30 and which is of the grooved type. A lever cam arm 107 having its lower end pivoted to a bracket 108, arranged at the base of the machine, is connected at its upper end by means of a link 109 to an operating arm 105 carried by the shaft 100. The lever arm 107 carries a roller 110 which engages with the groove of the cam 106. The cam is so designed as to produce a substantially uniform backward and forward oscillatory motion to the discharge levers 24 and it is so formed that the levers will pick up and feed the can rearwardly from the position to which it has been moved by the pusher. In Fig. 8 the cam and discharge levers are shown in two positions, an additional fragmentary view of the upper end of the levers being also shown. In the full line position shown, the cam is forcing the levers rearwardly so as to engage the can which has been pushed to the position shown by the pusher 22 and the extreme forward movement of the levers is shown by the full dotted line position.

Referring now more particularly to Figs. 1 to 3 and 9 to 13, inclusive, where I show details of the cover handling mechanism, 115 are standards secured to the platform 57 of the machine and pivotally carrying at their upper ends the cover hopper 116. This hopper is mounted upon trunnions 117 (see Fig. 12) which are rotatably carried in suitable bearings. This hopper is U-shaped and is provided with vertical slots 118 formed in its two opposite walls for the reception of the upper ends 139 of the cover ejector arms 119. One end of the hopper is open and this end is arranged adjacent the cover guide or chute 114. The covers are fed to this guide or chute, which is inclined, by means of the cover feeding mechanism 120 of the can and cover washing machine. This mechanism comprises a stationary bar 121 which is provided with indentations 122 for centralizing and spacing the covers as they are being fed, and a dog feed bar 123 is also provided for feeding the covers in periodic manner along the stationary rack. This feed bar has a plurality of feed dogs 124 which push the can covers from one recess 122 to another on their rearward movement. These dogs are pivoted so that they will ride under the covers on their return movement. This feed bar is actuated by a cover feed dog arm 125 and by a link 126 connecting the outer end of this arm with a bracket 127 carried by the feed bar. The arm 125 is mounted on the vertical feed bar shaft 65 and is operated in unison with the can feed bars 50 so that each time a can is fed from the washer a corresponding cover will also be fed therefrom. When a cover has reached the position of the forward cover in Fig. 1, it will roll down the guide or chute 114 and into the hopper 116.

One of the trunnions 117 of the feed hopper is extended beyond its bearing and mounted thereon is an elliptical sprocket wheel 130. A sprocket chain 131 passes over the top of the sprocket 130 and a counterweight 132 is attached to the upper end, and the lower end of the chain extends downwardly through the platform 57 where it is connected to a fulcrum arm 133. This fulcrum arm is pivoted at 134 to a suitable bracket carried by the frame of the machine and at its inner end it is provided with a roller 135. This roller is engageable with a cover hopper cam 136. This cam is mounted upon the cam shaft 30 and, therefore, operates in unison with the other mechanisms hereinbefore described. This cam has a cylindrical surface 137 concentric with the axis of the shaft 30. This surface is so proportioned that the hopper is kept in its normal vertical position during a complete cycle of the machine except for the time when a can is immediately in front of the hopper and before being discharged from the platform 57, at which time the depressed surface 138 permits the weight 132 to draw the hopper down to the position shown in Fig. 10, after which it is immediately raised again to its normal vertical position shown in Fig. 9 where it is kept until the next cycle. Due to the eliptical form of the sprocket wheel 130, it will be seen that the greater turning moment is produced upon the hopper trunnions at the beginning of the movement and that as the hopper approaches the position shown in Fig. 10 the effective power produced by the weight is lessened.

Arranged immediately beneath the cover hopper 116 is the cover ejector 129, the upper ends 139 of whose arms 119, hereinbefore described, pass through the slots 118 of the hopper. These arms are connected together at the bottom by means of a web 140 and they are pivoted at their lower ends by being mounted upon a shaft 141. This shaft is suitably journaled in the standards 115. An arm 142 is secured to the hub 143 of the ejector and the outer end of this arm provides a circular bearing 144 for connecting pin 145. The pin is rotatably mounted in the bearing 144 and has an aperture 146 formed in its projecting end for reception of the bent end 147 of a connecting rod 148 (see Fig. 13). The lower end of the connecting rod is connected to the rearward end of a fulcrum lever 149. The opposite end of the fulcrum lever is engageable with the cover ejector cam 150. This cam is mounted on the cam shaft 39 and is formed with a perimeter which is for the most part concentric with the axis of the shaft and with a raised portion 151. This raised portion gives a rather quick movement to the ejector whereby the cover is quickly pushed out of the cover hopper 116. A weight 128 is attached to the fulcrum lever 149 so as to normally maintain the ejector 119 in its inoperative position. This cam is so timed that it starts to operate as the cover hopper is being lowered to the position shown in Fig. 10 and in which position it is shown as having traveled the maximum distance and as having pushed the cover over into the mouth of the can. When the lip of the cover rests upon the hopper, as shown in Fig. 10, the reverse movement of the hopper to its normal position will lift the cover slightly, thus releasing the hopper whereupon the cover will again fall back into the mouth of the can.

It is not sufficient that the cover be merely placed on top of the can and in registration with the mouth, but in order to properly close the can and make it suitable for transportation, it is necessary that the cover be forced tightly into the opening of the mouth of the can. This is accomplished by the cover presser 26. This presser comprises a relatively long arm 155 which is pivoted at its forward end to the rear edge of the can washer and at such an elevation that it will reach all the cans within the range of the machine. It is provided at its rear end with a presser block 156 made preferably of wood or other suitable material so that the top of the cover will not be damaged. The arm is of such length that the presser block will come in the center of the cover when in the position where the cover has been placed thereupon by the cover hopper and cover ejector and before it is moved rearwardly off of the platform. This arm is actuated by a presser cam 157 which is mounted upon the cradle shaft 70. The cam is connected to the presser arm by means of a slotted link 158 which is pivotally attached at its upper end to a bracket 159 carried by the arm. The slotted link is provided at a point substantially at its center with a roller 160 and is slotted at its lower end and disposed about the cradle shaft 70. This connection permits the link to float and to oscillate slightly as the arm is moved vertically. The roller 160 is arranged on top of the cam or the side which is toward the presser arm, and it, therefore, raises the presser arm to its upper position. The major part of the perimeter of this cam is concentric with the axis of the shaft so that the presser arm is held in its upper inoperative position at all times except for an instant immediately following the placing of the can cover within the mouth of the can. A depression 161, having steeply inclined sides, is provided for permitting the presser arm to be lowered at this time. As shown in Fig. 1, the presser is in its operative position and has pressed the cover onto the can. The roller 160 is so arranged with respect to the perimeter of the cam that for the maximum sized cans and the medium sized cans the roller will not reach the bottom of the depression for these cans. This is done for the reason that the presser must have sufficient movement to enable it to press the covers of the smaller cans in place. The covers are pushed into place merely by the weight of the arm 155 and the pad 156 as the arm is released by the roller riding down the incline of the cam. The action of this presser is positive and firm so that the can covers will be forced at least part way into the mouths of the cans, but its movement is so even and gradual that there is substantially no noise and no injury caused to the cover.

After the cover has been placed upon the can, the discharge levers 24 are actuated to push the can with its assembled cover off of the platform 57 of the device. A suitable conveyer table 165 having the customary rollers 166 is preferably arranged in front of the platform 57 to receive the completely capped cans.

It is believed that the operation of the machine will be obvious from the foregoing description, but for further clarity a brief statement of operation is here given. As a washed can with its mouth downwardly is ejected from the washer, it is moved onto the tilting table 20. The rear end of this table is then tilted downwardly which tips the upper end of the can rearwardly toward the cradle 21. When the table has been tilted downwardly substantially to its maximum lower position, the fingers 78 of the cradle pick up the can, the lip of the can resting against the detents 80. At the time the cradle engages the can, its angular position is such as to correspond substantially to the tilted position of the can so that it is smoothly and evenly lifted from the tilting table and is rotated in a counterclockwise direction so as to invert it. As the can is rotated beyond the horizontal position, it will slide endwise until its bottom engages the stops 83 of the cradle. When the cradle has carried the can to a position in its rotation slightly preceding that shown in Fig. 7, the pusher 22 will serve to push the can out of the cradle at about the time when the bottom of the can reaches the level of the platform 57. The edge of the can will, therefore, rest upon the platform 57 and be set onto the can lowering shelf 23 which has been previously raised to the position shown in Fig. 7, in which position its surface is at about the same angle as that assumed by the can bottom at this time. The can while resting upon the shelf will thus be gently lowered to its upright position as it is being moved rearwardly by the pusher 22. When the can has reached the position shown in Fig. 1, the can cover hopper which has previously received a cover will be actuated so as to move downwardly into engagement with the lip of the can at which time the ejector 119 will be actuated to discharge the cover from the hopper and push it over on top of the can. The hopper and ejector will then be returned to their normal inoperative positions and the cover presser 26 will be lowered so as to press the cover into the mouth of the can When the cover and can have thus been assembled, the discharge levers 24 will be actuated and the can will be pushed off of the platform 57 and onto the table 165.

It will be seen that since the cover hopper 116 and the cover presser 26 are actuated by gravity means, the device is more or less elastic and, therefore, applicable to cans of various heights. In Fig. 10 the can shown is the maximum height for the size of machine illustrated in the drawings. For intermediate and smaller sizes, the hopper would move downwardly to meet the lip of the can and be stopped by such engagement with the can. The upper end 139 of each ejector arm is made long enough to engage the cover within the limits of movement of the hopper. In like manner, the cover presser 26 has freedom of movement so that it will engage the covers of all cans within the range of the machine and will be stopped by such engagement.

In the appended claims the term rotating as applied to the cradle is to be interpreted as meaning that the cradle in performing its described functions revolves through a complete circle.

While I have shown and described the cam shaft 30 and the cradle shaft 70 as being preferably rotated in unison, it is obvious that they may be rotated in any desired suitable timed relation.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. The combination with a washing machine for cans and the like having can feeding means, of an unloading device, comprising a single rotating cradle, a tilting table for feeding an inverted can into the moving cradle, and means for discharging the can from the cradle and delivering it onto the platform of the machine.

2. The combination with a washing machine for cans and the like having can feeding means, of an unloading device, comprising a single rotating cradle, a tilting table for feeding an inverted can into the moving cradle, and pusher means for discharging the can from the cradle.

3. The combination with a washing machine for cans and the like having can feeding means, of an unloading device, comprising a single rotating can cradle, a table for feeding an inverted can into the moving cradle, pusher means for discharging the can from the cradle, and a tilting shelf for receiving the can on the platform of the machine and lowering it to its upright position.

4. The combination with a washing machine for cans and the like having can feeding means, of an unloading device, comprising a single rotating can cradle, a table for feeding an inverted can into the moving cradle, pusher means for discharging the can from the cradle, a tilting shelf for receiving the can on the platform of the machine and lowering it to its upright position, and means for discharging the can from the platform.

5. The combination with a washing machine for cans and the like having can feeding means, of an unloading device, comprising a tilting table arranged adjacent the washer feeding means for tipping the bottom of the inverted can forwardly, a single rotating cradle for removing the can from the table and rotating it to a substantially upright position, a pusher associated with the cradle for discharging the can from the cradle, a tilting can lowering shelf for receiving the can, discharge levers for moving the can off of the platform of the machine, and cam means for actuating the tilting table, pusher, can lowering shelf, and discharge levers in timed relation with each other and with the cradle.

6. The combination with a washing machine for cans and the like having can feeding means, of an unloading device, comprising a single rotating cradle, a tilting table for feeding an inverted can into the moving cradle and actuated in timed relation with the cradle, and means for discharging the can from the cradle and delivering it onto the platform of the machine.

7. The combination with a washing machine for cans and the like having can feeding means, of an unloading device, comprising a single rotating cradle, a tilting table for feeding an inverted can into the moving cradle and actuated in timed relation with the cradle, and means actuated in timed relation with the moving cradle for discharging the can therefrom and delivering it onto the platform of the machine.

8. The combination with a washing machine for cans and the like having can feeding means, of an unloading device, comprising a single rotating cradle, a tilting table for feeding an inverted can into the moving cradle and actuated in timed relation with the cradle, and pusher means actuated in timed relation with the cradle for discharging the can therefrom.

9. The combination with a washing machine for cans and the like having can feeding means, of an unloading device comprising a rotating cam shaft, a cradle shaft, means connecting said shafts so that they will rotate in timed relation, a cradle carried by said cradle shaft, a table for feeding an inverted can into the moving cradle and actuated in timed relation with the cradle, and means for discharging the can from the cradle and delivering it onto the platform of the machine.

10. The combination with a washing machine for cans and the like having can feeding means, of an unloading device comprising a rotating cam shaft, a cradle shaft, means connecting said shafts so that they will rotate in timed relation, a cradle carried by said cradle shaft, a table for feeding an inverted can into the moving cradle, means for discharging the can from the cradle and delivering it in an upright position onto the platform of the machine, and cam means carried by the cam shaft for governing the movements of the tilting table and the can discharging means, whereby said moving elements are operated in timed relationship with each other.

11. The combination with a washing machine for cans and the like having can feeding means, of an unloading device comprising a single rotating cam shaft, a cradle shaft, means connecting said shafts so that they will rotate in timed relation, a cradle carried by said cradle shaft, a tilting table for feeding an inverted can into the moving cradle, a pusher for discharging the can from the cradle, and cam means carried by the cam shaft for controlling the movements of the tilting table and the pusher, whereby said moving elements are operated in timed relationship with each other.

12. The combination with a washing machine for cans and the like having can feeding means, of an unloading device comprising a single rotating cam shaft, a cradle shaft, means connecting said shafts so that they will rotate in timed relation, a cradle carried by said cradle shaft, a tilting table for feeding an inverted can into the moving cradle, a pusher for discharging the can from the cradle, a tilting shelf for receiving the can onto the platform of the machine and lowering it to its upright position, and cam means carried by the cam shaft for controlling the movement of the tilting table, the discharge means, and the tilting shelf, whereby said moving elements are operated in timed relationship with each other.

13. The combination with a washing machine for cans and the like having can feeding means, of an unloading device comprising a single rotating cam shaft, a cradle shaft, means connecting said shafts so that they will rotate in timed relation, a cradle carried by said cradle shaft, a tilting table for feeding an inverted can into the moving cradle, a pusher for discharging the can from the cradle, a tilting shelf for receiving the can on the platform of the machine and lowering it to its upright position, means for discharging the can from the platform, and cam means carried by the cam shaft for controlling the movements of the tilting table, the pusher, the tilting shelf, and the can discharging means, whereby said moving elements are operated in timed relationship with each other.

14. The combination with a washing machine for cans and the like having can feeding means, of an unloading device, comprising a single rotating cradle having two interspaced arms, each arm being formed with an upper can engaging portion and a lower can engaging portion, said cradle also being formed with can engaging stops carried at each of the ends of each of the arms, means for feeding an inverted can into the moving cradle, and means for discharging the can from the cradle and delivering it onto the platform of the machine.

15. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, and cover placing means for delivering a washed cover on to the top of the upright can.

16. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, cover placing means for delivering a washed cover onto the top of the upright can, and cover pressing means for forcing such cover in place within the mouth of the can.

17. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, a pivoted cover hopper, means for feeding covers one at a time to the hopper, and discharge means for ejecting the covers from the hopper and placing them upon the upright cans.

18. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, a pivoted cover hopper, means for feeding covers one at a time to the hopper, discharge means for ejecting the covers from the hopper and placing them upon the upright cans, and cover pressing means for forcing such covers in place within the mouths of the cans.

19. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, cover placing means for delivering a washed cover onto the top of the upright can, cam means carried by the cam shaft for controlling the movement of the table, the discharge means, and the cover placing means, whereby said moving elements are operated in timed relationship with each other.

20. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, cover placing means for delivering a washed cover onto the top of the inverted can, cover pressing means for forcing said cover in place within the mouth of the can, and cam means carried by the cam shaft for controlling the movement of the table, the discharge means, the cover placing means, and the cover pressing means, whereby said moving elements are operated in timed relationship with each other.

21. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, a pivoted cover hopper, means for feeding covers one at a time to the hopper, cover discharge means for ejecting the covers from the hopper and placing them upon the cans, and cam means carried by the cam shaft for controlling the movement of the table, the can discharge means, the cover hopper, the cover feeding means, and the cover discharge means, whereby said moving elements are operated in timed relationship with each other.

22. The combination with a washing machine for cans and the like having can and cover feeding means, of an unloading device, comprising a single rotating can cradle, a table for feeding an inverted can into the moving cradle, means for discharging the can from the cradle and delivering it onto the platform of the machine, a pivoted cover hopper, means for feeding covers one at a time to the hopper, cover discharge means for ejecting the covers from the hopper and placing them upon the upright cans, a cover presser for forcing the covers into place within the mouths of the cans, and cam means carried by the cam shaft for controlling the movement of the table, the can discharge means, the cover hopper, the cover feeding means, the cover discharge means, and the cover presser, whereby said moving elements are operated in timed relationship with each other.

23. The combination with a washing machine for cans and the like, of an unloading device comprising a single rotating can cradle, means for constantly rotating said cradle through a complete circle, means for feeding an inverted can into the cradle, and means for discharging the can from the cradle.

24. The combination with a washing machine for cans and the like, of an unloading device comprising a positively actuated rotating can cradle having a single can engaging surface, means for rotating said cradle through a complete circle, means for feeding an inverted can into the cradle, and means for discharging the can from the cradle.

25. The combination with a washing machine for cans and the like having can feeding means, of an unloading device, comprising a positively actuated rotating cradle having a single can engaging surface, means for rotating said cradle through a complete circle, means for feeding an inverted can into the moving cradle, and means for discharging the can from the moving cradle and delivering it onto the platform of the machine.

26. The combination with a washing machine for cans and the like, of an unloading device, comprising a positively actuated rotating can cradle having a single can engaging support, means for rotating said cradle through a complete circle, means for feeding an inverted can into the cradle, means movable in a path which is parallel to the plane of rotation of the cradle for discharging the can from the cradle, and cover placing means for delivering a washed cover onto the top of the upright can.

27. The combination with a washing machine for cans and the like, of an unloading device, comprising a positively actuated rotating can cradle having a single can engaging support, means for rotating said cradle through a complete circle, means for feeding an inverted can into the cradle, means movable in a path which is parallel to the plane of rotation of the cradle for discharging the can from the cradle, and cover placing means for delivering a washed cover onto the top of the upright can, and means for forcing such cover in place within the mouth of the can.

E. ROY ALLING.